US009891762B2

(12) United States Patent
Lee et al.

(10) Patent No.: US 9,891,762 B2
(45) Date of Patent: Feb. 13, 2018

(54) TOUCH SCREEN DEVICE AND METHOD FOR DRIVING THE SAME

(71) Applicant: LG DISPLAY CO., LTD., Seoul (KR)

(72) Inventors: Sangyong Lee, Seoul (KR); Hyeongwon Kang, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 14/473,163

(22) Filed: Aug. 29, 2014

(65) Prior Publication Data

US 2015/0062081 A1   Mar. 5, 2015

(30) Foreign Application Priority Data

Aug. 30, 2013 (KR) .................. 10-2013-0104344

(51) Int. Cl.
  *G06F 3/044* (2006.01)
  *G06F 3/041* (2006.01)

(52) U.S. Cl.
  CPC ............ *G06F 3/044* (2013.01); *G06F 3/0412* (2013.01); *G06F 3/0418* (2013.01)

(58) Field of Classification Search
  CPC .. H03H 11/04; H03H 11/252; H03H 11/1252; H03H 11/1204; H03H 11/1217;
  (Continued)

(56) References Cited

U.S. PATENT DOCUMENTS 4,926,135 A * 5/1990 Voorman ............... H03H 11/04
                                                            330/107
7,075,364 B2 * 7/2006 Gudem .............. H03H 11/1252
                                                            327/552
(Continued)

FOREIGN PATENT DOCUMENTS

CN     101727235 A    6/2010
CN     102624412 A    8/2012
(Continued)

OTHER PUBLICATIONS

Office Action issued in United Kingdom Patent Application No. GB1415341.5, dated Mar. 5, 2015, 8 pages.
(Continued)

*Primary Examiner* — Jennifer Mehmood
*Assistant Examiner* — Sardis F Azongha

(57) ABSTRACT

A touch screen device includes a touch screen panel including Tx lines, Rx lines, and touch sensors formed at crossings of the Tx lines and Rx lines; a Tx driving circuit for supplying a driving pulse to the Tx lines; and an Rx driving circuit for sampling charge variations of the touch sensors, which are received through the Rx lines, and converting the received charge variations into touch raw data, wherein the Rx driving circuit includes: a noise filter that removes noise of signals received from the Rx line; an integrator that accumulates the charge variations passing through the noise filter; a sampling circuit that samples the accumulated charge variation of the integrator; and an analog to digital converter that converts the charge variation sampled by the sampling circuit into the touch raw data, the noise filter being a biquad bandpass filter including variable resistors and variable capacitors.

13 Claims, 10 Drawing Sheets

(58) Field of Classification Search
CPC ........... H03H 11/1291; H03H 11/1213; H03H 19/00; G06F 3/044; G06F 3/0412; G06F 3/0418; G06F 2203/04104; G06F 3/0416; G02F 1/13338

See application file for complete search history.

(56) References Cited

U.S. PATENT DOCUMENTS

| | | | |
|---|---|---|---|
| 8,031,094 B2* | 10/2011 | Hotelling | 341/139 |
| 8,463,225 B2* | 6/2013 | Igarashi | H04B 1/30 |
| | | | 375/345 |
| 2006/0038610 A1 | 2/2006 | Gudem et al. | |
| 2011/0063154 A1 | 3/2011 | Hotelling et al. | |
| 2011/0170628 A1* | 7/2011 | Oishi | H04L 27/04 |
| | | | 375/295 |
| 2013/0141372 A1* | 6/2013 | Kang | G06F 3/041 |
| | | | 345/173 |
| 2013/0176269 A1* | 7/2013 | Sobel | G06F 3/0416 |
| | | | 345/174 |
| 2014/0267129 A1* | 9/2014 | Rebeschi | G06F 3/0418 |
| | | | 345/174 |

FOREIGN PATENT DOCUMENTS

| | | |
|---|---|---|
| CN | 103064571 A | 4/2013 |
| CN | 103135840 A | 6/2013 |
| GB | 2340613 A | 2/2000 |

OTHER PUBLICATIONS

Office Action dated Nov. 30, 2016 for Chinese Application No. 201410437881.3, 13 pages.

* cited by examiner

Fig. 8A
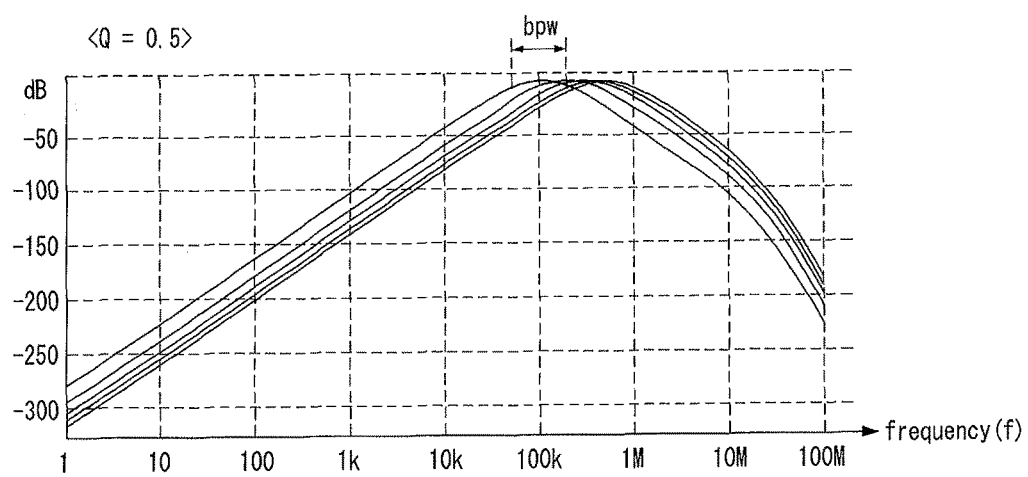
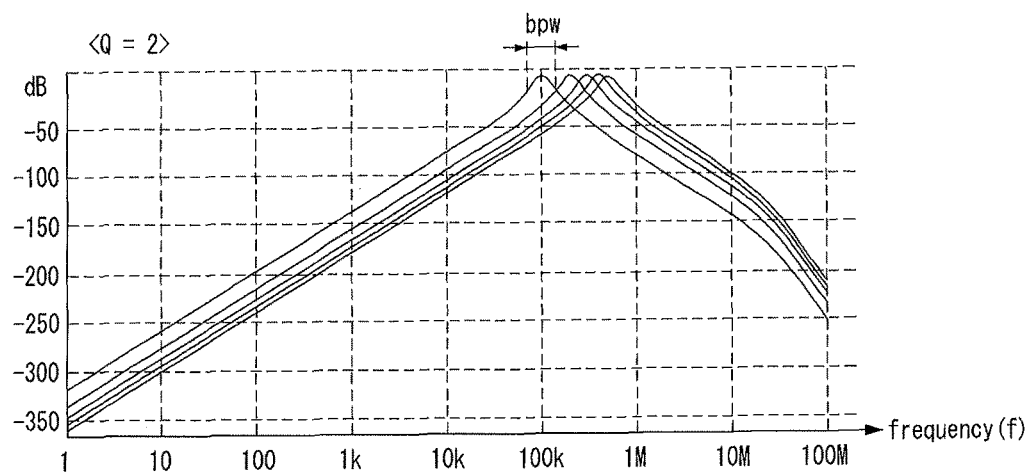
Fig. 8B

Fig. 9A

| Q = 0.5 | Variable Res. | | Cap | |
|---|---|---|---|---|
| Fc | Re | R1 | Ce | C1 |
| 500k | 120k | 60k | 2.65pF | 5.3pF |
| 400k | 150k | 75k | 2.65pF | 5.3pF |
| 300k | 200k | 100k | 2.65pF | 5.3pF |
| 200k | 300k | 150k | 2.65pF | 5.3pF |
| 100k | 600k | 300k | 2.65pF | 5.3pF |

Fig. 9B

| Q = 2 | Variable Res. | | Cap | |
|---|---|---|---|---|
| Fc | Re | R1 | Ce | C1 |
| 500k | 60k | 120k | 5.3pF | 2.65pF |
| 400k | 75k | 150k | 5.3pF | 2.65pF |
| 300k | 100k | 200k | 5.3pF | 2.65pF |
| 200k | 150k | 300k | 5.3pF | 2.65pF |
| 100k | 300k | 600k | 5.3pF | 2.65pF |

TOUCH SCREEN DEVICE AND METHOD FOR DRIVING THE SAME

This application claims the priority benefit of Korean Patent Application No. 10-2013-0104344 filed on Aug. 30, 2013, which is incorporated herein by reference for all purposes as if fully set forth herein.

BACKGROUND

Field

This document relates to a touch screen device and a method for driving the same.

Related Art

A user interface (UI) enables the communication of a user with various kinds of electric and electronic devices, so that the user can easily control the devices. Representative examples of the user interface are a keypad, a keyboard, a mouse, an on-screen display (OSD), a remote controller having an infrared communication or radio frequency (RF) communication function, and the like. The user interface technology has continuously developed to improve the user's sensitivity and ease of operation. The user interface has evolved into a touch UI, a voice recognition UI, a 3D UI, etc. The touch UI tends to be adopted in portable information devices, but has also expanded to electronic home appliances.

As one example of a touch screen for implementing the touch UI, a mutual capacitance type touch screen device that can respectively recognize multiple touches is gaining popularity.

The mutual capacitance type touch screen device includes a touch screen panel having Tx lines, Rx lines crossing the Tx lines, and touch sensors formed at crossings of the Tx lines and the Rx lines. Each of the touch sensors has mutual capacitance. The touch screen device senses a charge variation of each of the touch sensors between the time before and after a touch to determine the touch or non-touch with a conductive material and the position of touch. The touch screen device calculates touch coordinates by supplying a driving pulse to the Tx lines of the touch screen panel, converting charge variations of the touch sensors, which are received through the Rx lines, into touch raw data which are digital data, and analyzing the touch raw data.

The touch screen device can minimize an erroneous calculation by removing noise of the charge variations of the touch sensors. However, the range of the noise of the charge variations of the touch sensors may be slightly different according to different products. Due to this, a different noise filter for removing the noise of the charge variations of the touch sensors needs to be used depending on specific products.

SUMMARY

The present invention has been made in an effort to provide a touch screen device including a noise filter capable of changing a pass band, and a method for driving the same.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 8A and 8B illustrate graphs showing pass band widths of a noise filter for different Q-factors;

FIG. 9A shows exemplary resistance values of variable resistors and capacitance values of variable capacitors when the Q-factor is 0.5;

FIG. 9B shows exemplary resistance values of variable resistors and capacitance values of variable capacitors when the Q-factor is 2;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be noted that detailed description of known art will be omitted if it is determined that the art can confuse an understanding of the embodiments of the invention.

Figure 1:
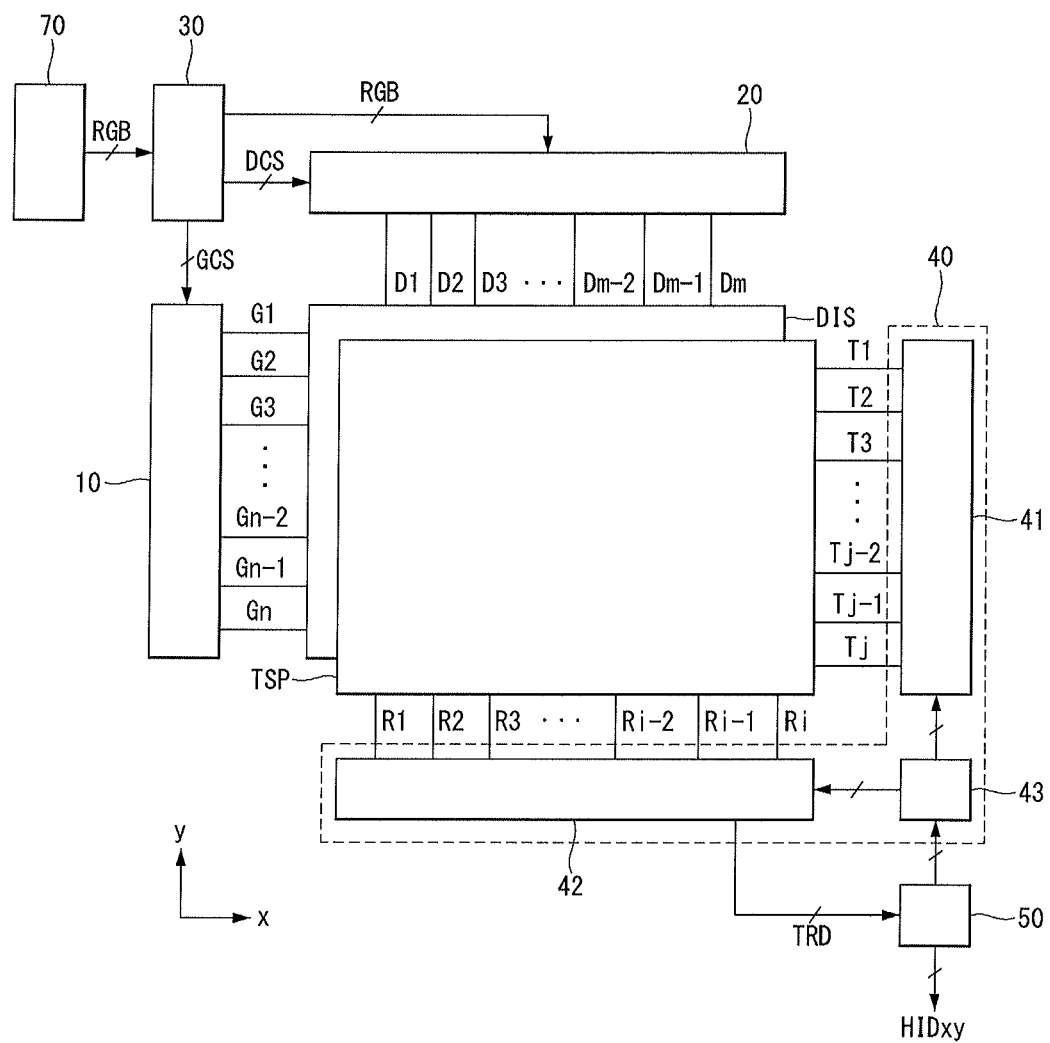
FIG. 1 is a block diagram schematically showing a display device and a touch screen device according to a first embodiment.

FIG. 1 is a block diagram schematically showing a display device and a touch screen device according to a first embodiment. Referring to FIG. 1, a display device includes a display panel DIS, a gate driving circuit 10, a data driving circuit 20, a timing controller 30, a host system 70, etc. A touch screen device includes a touch screen panel (TSP), a touch driving circuit 40, a touch coordinate calculation unit 50, etc.

The display device according to an embodiment may be implemented as a flat panel display device, such as liquid crystal display (LCD), field emission display (FED), plasma display panel (PDP), organic light emitting display (OLED), or electrophoresis (EPD). In the following description, the present disclosure will be described based on a liquid crystal display that implements a display device according to an embodiment, but it is noted that the present invention is not limited thereto.

The display panel DIS includes a liquid crystal layer formed between a lower substrate and an upper substrate. A plurality of data lines D1 to Dm (m is a natural number) and a plurality of gate lines G1 to Gn (n is a natural number) crossing the data lines D1 to Dm are formed on the lower substrate of the display panel DIS. Also formed are: a plurality of thin film transistors at crossings of the data lines D1 to Dm and the gate lines G1 to Gn, a plurality of pixel electrodes for charging liquid crystal cells to data voltages, a plurality of storage capacitors connected to the plurality of pixel electrodes to hold a voltage of the liquid crystal cells, etc.

A black matrix, color filters, etc., may be formed on the upper substrate of the display panel DIS. However, in the case where the display panel DIS has a color filter on the TFT (COT) structure, the black matrix and the color filter may be formed on the lower substrate of the display panel DIS. The display panel DIS may be implemented in any known mode including a twisted nematic (TN) mode, a vertical alignment (VA) mode, an in-plane switching (IPS) mode, and a fringe field switching (FFS) mode.

Polarizing plates are respectively attached to the upper and lower substrates GLS1 and GLS2 of the display panel DIS. Alignment layers for setting a pre-tilt angle of liquid crystals are respectively formed on inner surfaces of the upper and lower substrates, which are contacted with liquid crystals. Column spacers for maintaining cell gaps of the liquid crystal cells are formed between the upper and lower substrates the display panel DIS. A backlight unit may be disposed below a rear surface of the display panel DIS. The backlight unit may be implemented in an edge type backlight unit and a direct type backlight unit to provide light to the display panel DIS.

The data driving circuit 20 receives digital image data RGB and a source timing control signal DSC from the timing controller 30. The data driving circuit 20 converts the digital video data RGB into positive/negative data voltages in response to the source timing controller DSC, and supplies the data voltages to the data lines. The gate driving circuit 10 sequentially supplies gate pulses (or scan pulses) synchronized with the data voltages to the gate lines G1 to Gn to select pixels of the display panel DIS to which the data voltages are supplied.

The timing controller 30 receives the digital image data RGB and timing signals from the host system 70. The timing signals may include a vertical sync signal, a horizontal sync signal, a data enable signal, a dot clock, etc. The vertical synchronization signal is a signal that defines one frame period. The horizontal synchronization signal is a signal that defines one horizontal period necessary to supply the data voltages to the pixels in one horizontal line in the display panel DIS. The data enable signal is a signal that defines a period during which effective data are input. The dot clock is a signal that repeats with a short cycle time.

In order to control the operation timings of the gate driving circuit 10 and the data driving circuit 20, the timing controller 30 generates a source timing control signal DCS for controlling the operation timing of the data driving circuit 20 and a gate timing signal GCS for controlling the operation timing of the gate driving circuit 10 based on timing signals. The timing controller 30 outputs the gate timing control signal GCS to the gate driving circuit 10, and outputs the digital image data RGB and the source timing control signal DCS to the data driving circuit 20.

The host system 70 may be implemented as any one of a navigation system, a set-top box, a DVD player, a Blu-ray disk player, a personal computer (PC), a home theater system, a broadcast receiver, and a phone system. The host system 70 includes a system on chip (SoC) with a built-in scaler to convert the digital image data RGB of an input image into a format suitable for display on the display panel DIS. The host system 70 transmits the digital image data RGB and the timing signals to the timing controller 30.

The touch screen device according to an embodiment will now be described in detail. A touch screen panel TSP includes Tx lines T1 to Tj (j is a natural number of 2 or greater), Rx lines R1 to Ri (i is a natural number of 2 or greater) crossing the Tx lines T1 to Tj, and i×j touch sensors formed at crossings of the Tx lines T1 to Tj and Rx lines R1 to Ri. The respective touch sensors may be implemented to have mutual capacitance in terms of an equivalent circuit, but it is noted that the touch sensors are not limited thereto.

In the case where the touch screen device is combined with the display device, the touch screen panel TSP may be joined to an upper portion of the display panel DIS. Particularly, in the case where the display device is implemented as the liquid crystal display, the touch screen panel TSP may be joined onto an upper polarizing plate of the display panel DIS or joined between the upper polarizing plate and the upper substrate of the display panel DIS. In addition, the touch sensors of the touch screen panel TSP may be formed on the lower substrate within the display panel together with a pixel array (in an in-cell type).

The touch driving circuit 40 supplies the driving pulse to the Tx lines T1 to Tj, and is synchronized by the driving pulse to sense the charge variations of the respective touch sensors through the Rx lines R1 to Ri. The touch driving circuit 40 includes a Tx driving circuit 41, an Rx driving circuit 42, and a touch controller 43. The Tx driving circuit 41, the Rx driving circuit 42, and the touch controller 43 may be integrated in one read-out IC (ROIC).

Figure 2:
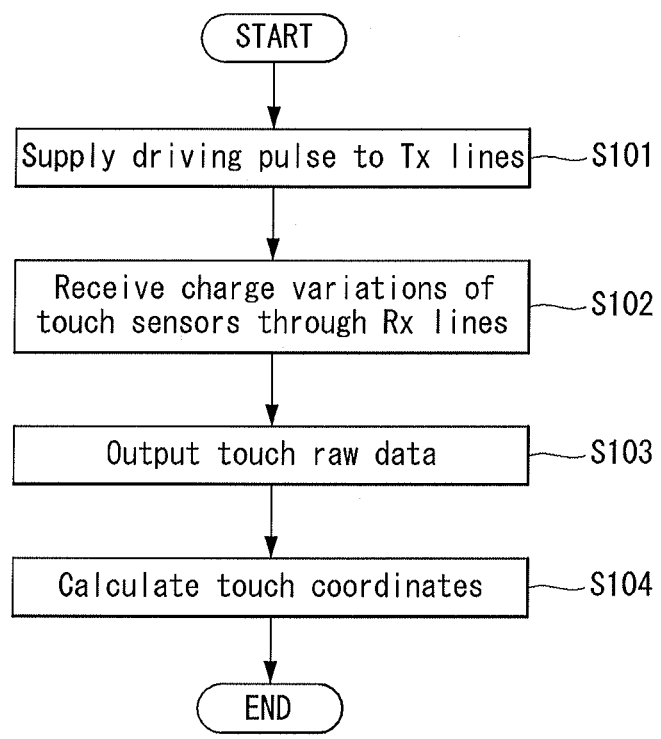
FIG. 2 is a flowchart showing a method for driving the touch screen device according to the first embodiment.

FIG. 2 is a flowchart showing a method for driving the touch screen device according to the first embodiment. The method for driving the touch screen device according to the first embodiment will be described in detail below.

The Tx driving circuit 41 selects a Tx line, to which the driving pulse is to be output, under the control of the touch controller 43, and supplies the driving pulse to the selected Tx line (S101). The Rx driving circuit 42 selects Rx lines, which are to receive charge variations of the touch sensors, under the control of the touch controller 43, and receives the charge variations of the touch sensors through the selected Rx lines (S102). The Rx driving circuit 42 samples the charge variations of the touch sensors, which are received through the Rx lines R1 to Ri, and converts the received charge variations into touch raw data TRD (S103). The Rx driving circuit 42 and a driving method thereof will be described later in detail with reference to FIGS. 3 to 5.

The touch controller 43 generates a Tx setup signal for setting a Tx channel to output the driving pulse from the Tx driving circuit 41, and an Rx setup signal for setting an Rx channel to receive a touch sensor voltage from the Rx driving circuit 42. In addition, the touch controller 43 generates timing control signals for controlling the operation timings of the Tx driving circuit 41 and the Rx driving circuit 42.

The touch coordinate calculation unit 50 receives the touch raw data TRD from the touch driving circuit 40. The touch coordinate calculation unit 50 calculates touch coordinates following the calculation method of touch coordinates according to an embodiment, and outputs touch coordinate data including information of the touch coordinates (S104). The touch coordinate calculation unit 50 may be implemented as a micro controller unit (MCU). The host system 70 analyzes the touch coordinate data HIDxy input from the touch coordinate calculation unit 50, and executes an application program associated with the coordinates at which a touch is generated by a user.

Figure 3:
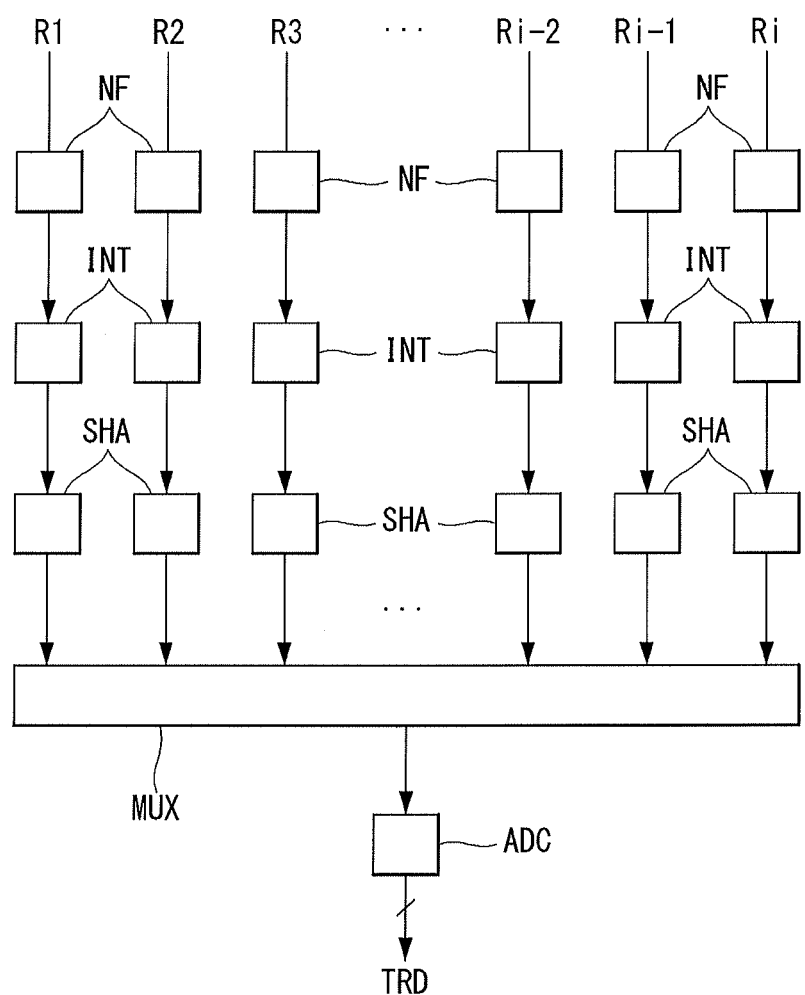
FIG. 3 is a block diagram specifically showing an Rx driving circuit in FIG. 1.
Figure 4:
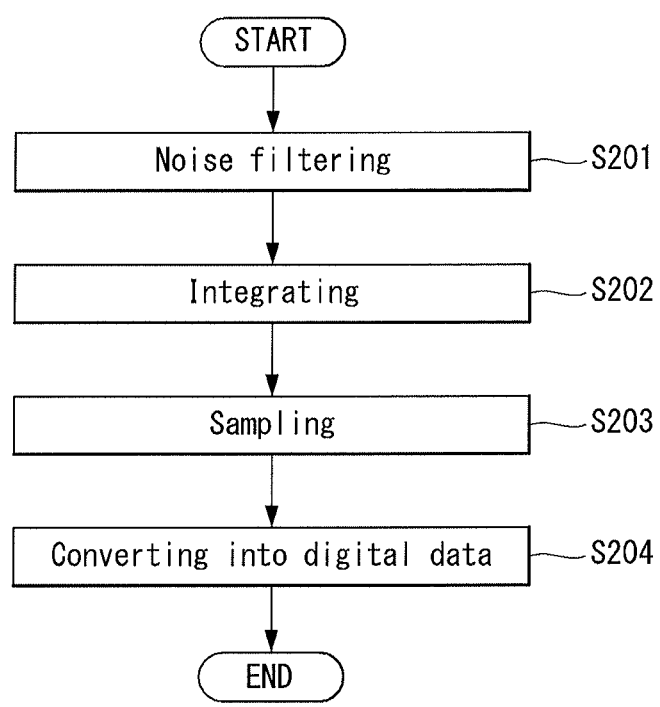
FIG. 4 is a flowchart showing a method for driving an Rx driving circuit according to an embodiment.
Figure 5:
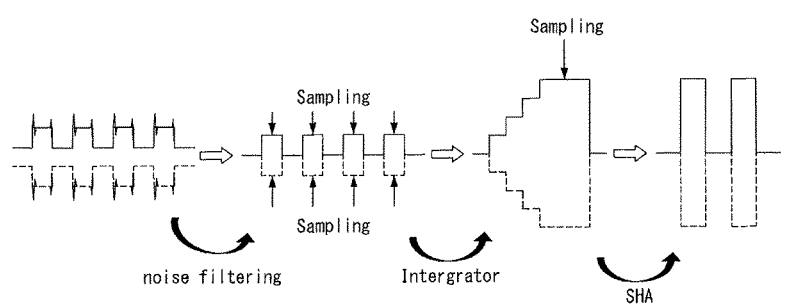
FIG. 5 is a waveform diagram showing outputs of a noise filter, an integrator, and a sampling circuit.

FIG. 3 is a block diagram specifically showing an Rx driving circuit in FIG. 1. FIG. 4 is a flowchart showing a method for driving an Rx driving circuit according to an embodiment of the present invention. FIG. 5 is a waveform diagram showing outputs of a noise filter, an integrator, and a sampling circuit. Hereinafter, the Rx driving circuit 42 and a driving method thereof will be described in detail with reference to FIGS. 3 to 5.

Referring to FIG. 3, the Rx driving circuit 42 includes noise filters NF, integrators INT, sampling circuits SHA, a multiplexer MUX, and an analog to digital converter ADC, which are connected to the respective Rx lines R1 to Ri.

First, the noise filters NF remove noise of signals received from the Rx lines as shown in FIG. 5. Specifically, a noise filter NF removes high-frequency noise from a positive signal or a negative signal to output the resultant signal to the integrator INT. In the case where one Rx line of adjacent Rx lines outputs a positive signal, the other Rx line outputs a negative signal.

Figure 6:
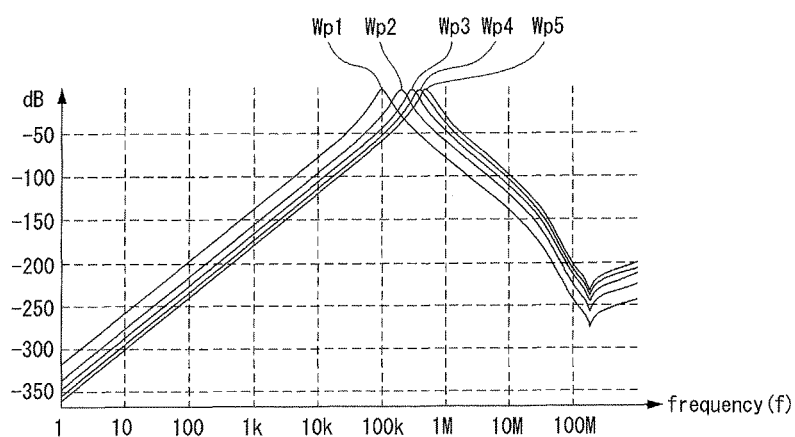
FIG. 6 is a graph showing pass bands of a noise filter.

Particularly, the noise filter NF may include variable resistors to completely remove noise of the signals received from the Rx line. In this case, the noise filter NF may change the pass band by adjusting the resistance values of the variable resistors to change the center frequency, as shown in FIG. 6. For example, the noise filter NF may change the pass band by adjusting the resistance values of the variable resistors to change the center frequency ωp into any one of first to fifth center frequencies Wp1 to Wp5. The change of the pass band by adjusting the resistance values of the variable resistors of the noise filter N will be later described in detail with reference to FIGS. 7 to 9 (S201).

Second, the integrator INT accumulates the charge variations which pass through the noise filter NF. Specifically, the integrator INT accumulates and adds the positive or negative signal, which passes through the noise filter NF and then is input, P times (P is a natural number), thereby increasing the size of the charge variation. FIG. 5 illustrates a case where P is 4, but the present invention is not limited thereto.

When the high-frequency noise is not removed by the noise filter NF, the high-frequency noise is also accumulated and added by the integrator INT, causing a problem in that the signal to noise ratio (SNR) is decreased (S202).

Third, the sampling circuit SHA samples the charge variation accumulated by the integrator INT (S203), as shown in FIG. 5.

Fourth, the multiplexer MUX receives the charge variation sampled by the respective sampling circuits SHA of the first to (i)th Rx lines R1 to Ri. The multiplexer MUX sequentially outputs the charge variations, which are sampled by the sampling circuits SHA of the first to i-th Rx lines R1 to Ri, to the analog to digital converter ADC, by a predetermined control. The analog to digital converter ADC converts the sampled charge variations, which are sequentially input from the multiplexer MUX, into touch raw data TRD, and outputs the converted data (S204).

Figure 7:
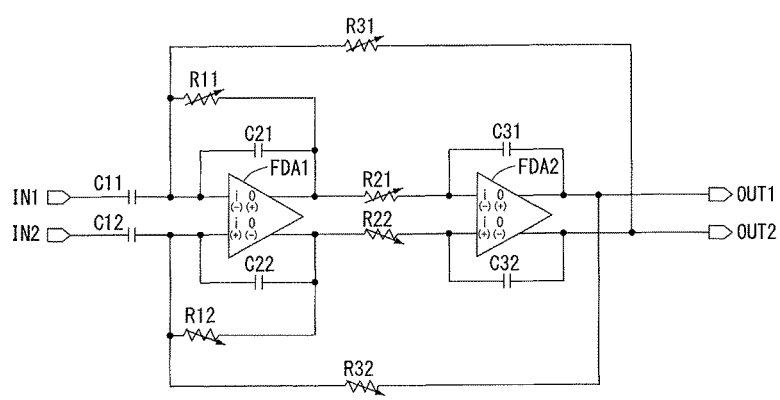
FIG. 7 is a circuit diagram specifically showing a noise filter according to a first embodiment.

FIG. 7 is a circuit diagram showing a noise filter according to a first embodiment. Referring to FIG. 7, a noise filter according to a first embodiment may be implemented as a biquad bandpass filter.

The biquad bandpass filter according to a first embodiment is implemented in a fully differential type, and includes two fully differential amplifiers, a plurality of variable resistors, and a plurality of variable capacitors. The biquad bandpass filter may change the center frequency (ωp) by adjusting resistance values of the variable resistors, as shown in FIG. 6. In addition, the biquad bandpass filter can reciprocally change a Q-factor by controlling the variable resistors and the variable capacitors. As shown in FIGS. 8A and 8B, the greater the Q-factor, the narrower the pass band width (bpw), and the smaller the Q-factor, the wider the pass band width (bpw). Resultantly, the present embodiment can change the pass band by adjusting the resistance values of the variable resistors to change the center frequency (Wp), and can change the pass band width (bpw) by adjusting the resistance values of the variable resistors and the capacitance values of the variable capacitors.

Now, the biquad bandpass filter according to a first embodiment will be described in detail with reference to FIG. 7. The biquad bandpass filter includes first and second input terminals IN1 and IN2, first and second output terminals OUT1 and OUT2, first and second fully differential amplifiers FDA1 and FDA2, a plurality of variable resistors R11, R12, R21, R22, R31, and R32, and a plurality of variable capacitors C11, C12, C21, C22, C31, and C32.

The first and second input terminals IN1 and IN2 are connected to adjacent Rx lines. That is, in the case where the first input terminal IN1 is connected to a (k)th Rx line, the second input terminal IN2 is connected to a (k+1)th Rx line. The reason is that the biquad bandpass filter uses the first and second fully differential amplifiers FAD1 and FAD2, which amplify the difference in charge variation input through the adjacent Rx lines.

Each of the first and second fully differential amplifiers FDA1 and FDA2 includes a negative polarity input terminal (i(−)), a positive terminal (i(+)), a positive output terminal (o(+)), and a negative output terminal (o(−)). The first output terminal (OUT1) is connected to the positive output terminal (o(+)) of the second fully differential amplifier FDA2. The second output terminal (OUT2) is connected to the negative output terminal (o(−)) of the second fully differential amplifier FDA2.

The plurality of variable resistors includes (1-1)th, (1-2)th, (2-1)th, (2-2)th, (3-1)th, and (3-2)th variable resistors R11, R12, R21, R22, R31, and R32. The (1-1)th variable resistor R11 is connected between the negative input terminal (i(−)) and the positive output terminal (o(+)) of the first fully differential amplifier FDA1. The (1-2)th variable resistor R12 is connected between the positive input terminal (i(+)) and the negative output terminal (o(−)) of the first fully differential amplifier FDA1. The (2-1)th variable resistor R21 is connected between the positive output terminal (o(+)) of the first fully differential amplifier FDA1 and the negative input terminal (i(−)) of the second fully differential amplifier FDA2. The (2-2)th variable resistor R22 is connected between the negative output terminal (o(−)) of the first fully differential amplifier FDA1 and the positive input terminal (i(+)) of the second fully differential amplifier FDA2. The (3-1)th variable resistor R31 is connected between the negative input terminal (i(−)) of the first fully differential amplifier FDA1 and the negative output terminal (o(−)) of the second fully differential amplifier FDA2. The (3-2)th variable resistor R32 is connected between the positive input terminal (i(+)) of the first fully differential amplifier FDA1 and the positive output terminal (o(+)) of the second fully differential amplifier FDA2.

The plurality of variable capacitors include (1-1)th, (1-2)th, (2-1)th, (2-2)th, (3-1)th, and (3-2)th variable capacitors C11, C12, C21, C22, C31, and C32. The (1-1)th variable capacitor C11 is connected between the first input terminal IN1 and the negative input terminal (i(−)) of the first fully differential amplifier FDA1. The (1-2)th variable capacitor C12 is connected between the second input terminal IN2 and the positive input terminal (i(+)) of the first fully differential amplifier FDA1. The (2-1)th variable capacitor C21 is connected between the negative input terminal (i(−)) and the positive output terminal (o(+)) of the first fully differential amplifier FDA1. The (2-2)th variable resistor C22 is connected between the positive input terminal (i(−)) and the negative output terminal (o(+)) of the first fully differential amplifier FDA1. The (3-1)th variable capacitor C31 is connected between the negative input terminal (i(−)) and the positive output terminal (o(+)) of the second fully differential amplifier FDA2. The (3-2)th variable capacitor C32 is connected between the positive input terminal (i(+)) and the negative output terminal (o(-)) of the second fully differential amplifier FDA2.

The transfer function of the biquad bandpass filter may be calculated by equation 1.

$$\frac{V_{O1}}{V_{I1}} = \frac{S \cdot C11 \cdot R11 \cdot R31}{S^2 \cdot C21 \cdot C31 \cdot R11 \cdot R21 \cdot R31 + S \cdot C31 \cdot R21 \cdot R31 + R11} \quad \text{[Equation 1]}$$

In equation 1, VI1 represents the voltage that is input through the first input terminal IN1 and VO1 represents the voltage that is output through the first output terminal OUT1

Meanwhile, when the transfer function of equation 1 is expressed by a transfer function using gain value (K), center frequency ($\omega p$), and Q-factor (Q) as variables as shown in equation 2, the center frequency ($\omega p$) and the Q-factor (Q) may be changed by adjusting the resistance values of the variable resistors and the capacitance values of the variable capacitors. In equation 2, s represents the laplace domain.

$$H_{bq(s)} = \frac{K \cdot s}{s^2 + \left(\frac{\omega_p}{Q}\right) \cdot s + \omega_p^2} \quad \text{[Equation 2]}$$

In order to express the transfer function of equation 1 by a transfer function using gain value (K), center frequency ($\omega p$), and Q-factor (Q) as variables as shown in equation 2, the (1-2)th variable resistor R12 and the (1-3)th variable resistor R13 of equation 1 may be set to have the same resistance value, a first resistance value (RV1), and the (1-2)th variable capacitor C12 and the (1-3)th variable capacitor C13 of equation 1 may be set to have the same capacitance value, a first capacitance value (CV1). In this case, the transfer function of the biquad bandpass filter may be calculated by equation 3.

$$\frac{V_{O1}}{V_{I1}} = \frac{S \cdot \frac{C11}{CV1^2 \cdot R}}{S^2 + S \cdot \frac{1}{CV1 \cdot R11} + \frac{1}{CV1^2 \cdot RV1^2}} \quad \text{[Equation 3]}$$

Eventually, when compared equation 2 and equation 3 with each other, the gain value (K) may be calculated as shown in equation 4, the center frequency ($\omega p$) may be calculated as shown in equation 5, and the Q-factor (Q) may be calculated as shown in equation 6.

$$K = \frac{C11 \cdot R11}{CV1 \cdot RV1} \quad \text{[Equation 4]}$$

$$\omega_p = \frac{1}{CV1 \cdot RV1} \quad \text{[Equation 5]}$$

$$Q = \frac{R11}{RV1} \quad \text{[Equation 6]}$$

Therefore, the biquad bandpass filter may change the center frequency (Fc) by adjusting the first resistance value (RV1) corresponding to the resistance values of the (1-2)th variable resistor R12 and the (1-3)th variable resistor R13 as shown in FIGS. 9a and 9b. For example, as shown in FIG. 9a, the first resistance value (RV1) is adjusted from 120 kΩ to 200 kΩ, thereby changing the center frequency (Fc) from 500 kHz to 300 kHz.

In addition, the biquad bandpass filter may change the Q-factor (Q) by adjusting the first resistance value (RV1), and a second resistance value (RV2) corresponding to the resistance values of the (1-1)th variable resistor R11, as shown in FIGS. 9a and 9b. Particularly, the Q-factor (Q) of the biquad bandpass filter can be reciprocally changed as shown in FIGS. 9a and 9b. For example, as shown in FIG. 9a, when the first resistance value (RV1) is adjusted to 120 kΩ and the second resistance value (RV2) is adjusted to 60 kΩ, the Q-factor (Q) becomes 0.5. In addition, as shown in FIG. 9b, when the first resistance value (RV1) is adjusted to 60 kΩ and the second resistance value (RV2) is adjusted to 120 kΩ, the Q-factor (Q) becomes 2.

Even through the Q-factor (Q) is changed, the value obtained by multiplying the first resistance value (RV1) by the first capacitance value (CV1) corresponding the capacitance values of the (1-2)th variable capacitor C12 and the (1-3)th variable capacitor C13 needs to be constant at the same center frequency (Fc), as shown in FIGS. 9A and 9B. That is, in the case where the center frequency (Fc) is 500 kHz, the first resistance value (RV1) is 120 kΩ and the first capacitance value (CV1) is 2.65 pF when the Q-factor (Q) is 0.5. In addition, in the case where the center frequency (Fc) is 500 kHz, the first resistance value (RV1) is 60 kΩ and the first capacitance value (CV1) is 5.3 pF when the Q-factor (Q) is 2. Therefore, when the Q-factor (Q) is 0.5 or 2, the values obtained by multiplying the first resistance value (RV1) by the first capacitance value are the same as each other.

As above, for the convenience of description, the present invention has been described based on the first input terminal IN1, the first output terminal OUT1, the (1-1)th, (2-1)th, and (3-1)th variable resistors R11, R21, and R31, and the (1-1)th, (2-1)th, and (3-1)th variable capacitors C11, C21, and C31 of the biquad bandpass filter. However, the second input terminal IN2, second output terminal OUT2, the (1-2)th, (2-2)th, and (3-2)th variable resistors R11, R21, and R31, and the (1-2)th, (2-2)th, and (3-2)th variable capacitors C11, C21, and C31 of the biquad bandpass filter are substantially the same as those as described above.

As described above, the present embodiments can change the pass band by adjusting the resistance values of the variable resistors of the biquad bandpass filter to change the center frequency, and can change the pass band width by adjusting the resistance values of the variable resistors and the capacitance values of the capacitance values of the variable capacitors.

Figure 10A:
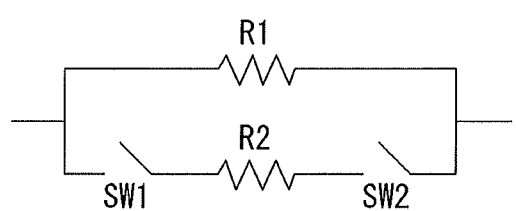
FIGS. 10A and 10B are exemplary views showing variable resistors and variable capacitors.
Figure 10B:
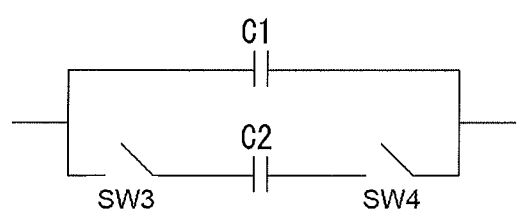

FIGS. 10A and 10B are exemplary views specifically showing variable resistors and variable capacitors. Referring to FIG. 10A, each of the variable resistors R11, R12, R21, R22, R31, and R32 of the biquad bandpass filter includes a first resistor R1, a second resistor R2, and switches SW1 and SW2.

The first resistor R1 and the second resistor R2 are connected in parallel. The resistance value of the first resistor R1 may be substantially the same as the resistance value of the second resistor R2. Both ends of the second resistor R2 are connected to the switches SW1 and SW2. That is, one end of the second resistor R2 is connected to the first switch SW1, and the other end of the second resistor R2 is connected to the second switch SW2.

The switches SW1 and SW2 are turned on in response to a predetermined control signal. For example, the switches SW1 and SW2 may be controlled by a control signal which swings between a first voltage and a second voltage, and may be designed so as to be turned on when a control signal of the first voltage is input and turned off when a control signal of the second voltage is input.

In addition, when the switches SW1 and SW2 are turned on, the variable resistors are connected in parallel, and thus the resistance value of the variable resistors when the switches SW1 and SW2 are turned on is ½ times the resistance value of the variable resistors when the switches SW1 and SW2 are turned off. In this case, the present invention can reciprocally change the Q-factor (Q) by adjusting the resistance values of the variable resistors and the capacitance values of the variable capacitors. Specifically, the resistance value of the respective (2-1)th, (2-2)th, (3-1)th, and (3-2)th variable resistors R21, R22, R31, and R32 and the resistance value of the respective (1-1)th and (1-2)th variable resistors R11 and R12 can be reciprocally changed by oppositely controlling the control signal supplied to the respective (2-1)th, (2-2)th, (3-1)th, and (3-2)th variable resistors R21, R22, R31, and R32 and the control signals supplied to the respective (1-1)th and (1-2)th variable resistors R11 and R12.

For example, when the control signal having the first voltage is supplied to the respective (2-1)th, (2-2)th, (3-1)th, and (3-2)th variable resistors R21, R22, R31, and R32, the control signal having the second voltage is supplied to the respective (1-1)th and (1-2)th variable resistors R11 and R12, so that the resistance value of the (2-1)th, (2-2)th, (3-1)th, and (3-2)th variable resistors R21, R22, R31, and R32 can be controlled to be ½ times the resistance value of the (1-1)th and (1-2)th variable resistors R11 and R12. Alternatively, when the control signal having the second voltage is supplied to the respective (2-1)th, (2-2)th, (3-1)th, and (3-2)th variable resistors R21, R22, R31, and R32, the control signal having the first voltage is supplied to the respective (1-1)th and (1-2)th variable resistors R11 and R12, so that the resistance value of the (2-1)th, (2-2)th, (3-1)th, and (3-2)th variable resistors R21, R22, R31, and R32 can be controlled to be 2 times the resistance value of the (1-1)th and (1-2)th variable resistors R11 and R12.

Referring to FIG. 10b, each of the variable capacitors C11, C12, C21, C22, C31, and C32 of the biquad bandpass filter includes a first capacitor C1, a second capacitor C2, and switches SW3 and SW4.

The first capacitor C1 and the second capacitor C2 are connected in parallel. The capacitance value of the first capacitor C1 may be substantially the same as the capacitance value of the second capacitor C2. Both ends of the second capacitor C2 are connected to the switches SW3 and SW4. That is, one end of the second capacitor C2 is connected to the third switch SW1 and the other end of the second capacitor C2 is connected to the fourth switch SW4.

The switches SW3 and SW4 are turned on in response to a predetermined control signal. For example, the switches SW3 and SW4 may be controlled by a control signal which swings between a first voltage and a second voltage, and may be designed so as to be turned-on when a control signal of the first voltage is input and turned-off when a control signal of the second voltage is input.

In addition, when the switches SW3 and SW4 are turned on, the capacitance value of the variable capacitors when the switches SW3 and SW4 are turned on is 2 times the capacitance value of the variable capacitors when the switches SW1 and SW2 are turned off since the variable capacitors are connected in parallel. Resultantly, the resistance value of the respective (2-1)th, (2-2)th, (3-1)th, and (3-2)th variable capacitors C21, C22, C31, and C32 and the capacitance value of the respective (1-1)th and (1-2)th variable capacitors C11 and C12 can be reciprocally changed by oppositely controlling the control signal supplied to the respective (2-1)th, (2-2)th, (3-1)th, and (3-2)th variable capacitors C21, C22, C31, and C32 and the control signal supplied to the respective (1-1)th and (1-2)th variable capacitors C11 and C12.

Figure 11:
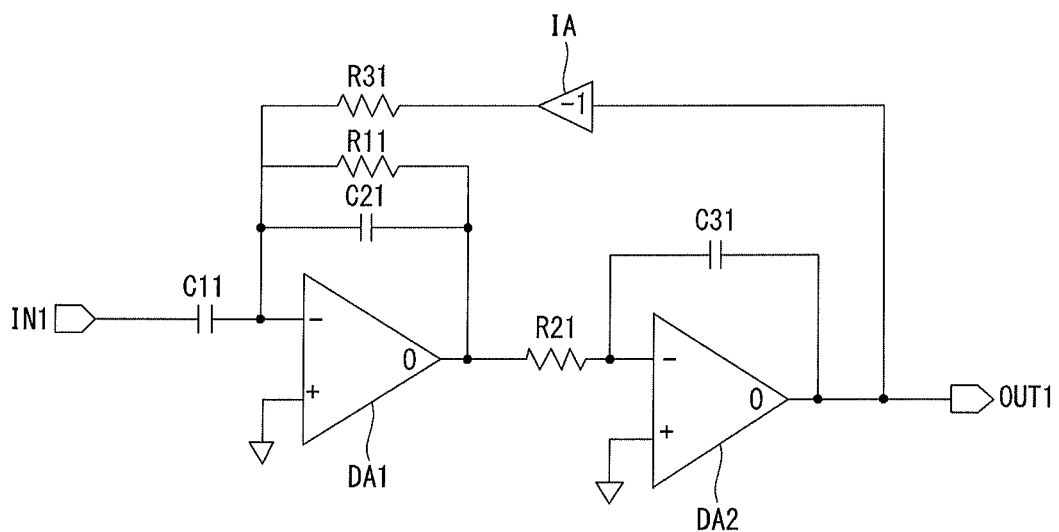
FIG. 11 is a circuit diagram showing a noise filter according to a second embodiment.

FIG. 11 is a circuit diagram showing a noise filter according to a second embodiment. Referring to FIG. 11, a noise filter according to the second embodiment may be implemented as a biquad bandpass filter.

The biquad bandpass filter according to the second embodiment is implemented in a single-ended type, and includes two differential amplifiers, a plurality of variable resistors, a plurality of variable capacitors, and an inverting amplifier. The biquad bandpass filter may change the center frequency ($\omega p$) by adjusting resistance values of variable resistors, as shown in FIG. 6. In addition, the biquad bandpass filter can reciprocally change the Q-factor by controlling the variable resistors and the variable capacitors. As shown in FIG. 8, the greater the Q-factor, the narrower the pass band width (bpw), and the smaller the Q-factor, the wider the pass band width (bpw). Resultantly, the present invention can change the pass band by adjusting the resistance values of the variable resistors to change the center frequency ($\omega p$), and can change the pass band width (bpw) by adjusting the resistance values of the variable resistors and the capacitance values of the variable capacitors.

Now, the biquad bandpass filter according to the second embodiment will be described in detail with reference to FIG. 11. The biquad bandpass filter includes a first input terminal IN1, a first output terminal OUT1, first and second differential amplifiers DA1 and DA2, a plurality of variable resistors R11, R21, and R31, a plurality of capacitors C11, C21, and C31, and an inverting amplifier IA.

The first input terminal IN1 is connected to the Rx line. Each of the first and second differential amplifiers DA1 and DA2 includes a negative input terminal (−), a positive input terminal (+), and an output terminal (o). The first output terminal (OUT1) is connected to the output terminal (o) of the second differential amplifier DA2.

The plurality variable resistors include first, second, and third variable resistors R11, R21, and R31. The first variable resistor R11 is connected between the negative input terminal ((−) and the positive output terminal (o(+)) of the first differential amplifier DA1. The second variable resistor R21 is connected between the output terminal (o) of the first differential amplifier DA1 and the negative input terminal (−) of the second differential amplifier DA2. The third variable resistor R31 is connected between the negative input terminal (−) of the first differential amplifier DA1 and the output terminal (o) of the second differential amplifier DA2.

The plurality variable capacitors include first, second, and third variable capacitors C11, C21, and C31. The first capacitor C11 is connected between the first input terminal IN1 and the negative input terminal (−) of the first differential amplifier DA1. The second variable capacitor C21 is connected between the negative input terminal (−) and the output terminal (o(+)) of the first differential amplifier DA1. The third variable capacitor C31 is connected between the negative input terminal (−) and the output terminal (o) of the second differential amplifier DA2.

The inverting amplifier IA is connected between the first output terminal OUT1 and the output terminal (o) of the second differential amplifier DA2.

The transfer function of the biquad bandpass filter according to the second embodiment may be calculated by equation 2. Here, when the second and third variable resistors R2 and R3 are set to have the same resistance value, a first resistance value RV1, and the (1-2)th variable capacitor C12 and the (1-3)th variable capacitor C13 are set to have the same capacitance value, a first capacitance value CV1, the transfer function of the biquad bandpass filter according to the second embodiment may be calculated by equation 3. Therefore, the gain value (K) may be calculated as shown in equation 4, the center frequency (Wp) may be calculated as shown in equation 5, and the Q-factor (Q) may be calculated as shown in equation 6.

In addition, the respective variable resistors R11, R21, and R31 of the biquad bandpass filter according to the second embodiment may be substantially the same as those as described with reference to FIG. 10A, and the respective variable capacitors C11, C21, and C31 may be substantially the same as those as described with reference to FIG. 10B.

The charge variation and the noise of each touch sensor may be different when the touch screen panel TSP is touched by a part of user's body and when the touch screen panel TSP is touched by a pen. Due to this, when the noise filter is set to be suitable for the case where the touch screen panel TSP is touched by a part of user's body, the noise may not be removed when the touch screen panel TSP is touched by a pen. In order to prevent this, the present embodiment may be configured such that the case where the touch screen panel TSP is touched by a part of user's body and the case where the touch screen panel TSP is touched by a pen are sensed differentially, and the pass band and the pass band width of the biquad bandpass filter are changed when the touch screen panel TSP is touched by a part of user's body and when the touch screen panel TSP is touched by a pen. As a result, the present embodiment can minimize the noise of the charge variation of the respective touch sensors.

As described above, the present invention can change the pass band by implementing the noise filter as the biquad bandpass filter and adjusting the resistance values of the variable resistors of the biquad bandpass filter to change the center frequency, and can change the pass band width by adjusting the resistance values of the variable resistors and the capacitance values of the variable capacitors. As a result, the present invention can change the pass band and the pass band width in advance so as to be optimized for removing the noise of the charge variation of each of the touch sensors before product shipping, thereby minimizing the noise of the charge variations of the respective touch sensors.

Further, the present invention can differentially sense the case where the touch screen panel TSP is touched by a part of user's body and the case where the touch screen panel TSP is touched by a pen, and change the pass band and the pass band width of the biquad bandpass filter when the touch screen panel TSP is touched by a part of user's body and when the touch screen panel TSP is touched by a pen. As a result, the present invention can minimize the noise of the charge variation of each of the touch sensors.

Further, the present invention can prevent the overflow of the charge variations accumulated in the integrator by minimizing the noise of the charge variation of each of the touch sensors to reduce the size of the charge variation accumulated in the integrator.

Further, the present invention can increase the number of times of integration of the charge variation accumulated in the integrator by minimizing the noise of the charge variation of each of the touch sensors to reduce the sizes of the charge variation accumulated in the integrator. As a result, the present invention can further improve the accuracy in the touch coordinate calculation.

Further, the present invention can improve the signal to noise ratio (SNR) by minimizing the noise of the charge variation of each of the touch sensors.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen device, comprising:
   a touch screen panel including a plurality of Tx lines, a plurality of Rx lines, and touch sensors formed at crossings of the Tx lines and Rx lines;
   a Tx driving circuit that supplies a driving pulse to the Tx lines; and
   an Rx driving circuit that samples charge variations of the touch sensors, which are received through the Rx lines, and converts the received charge variations into touch raw data,
   wherein the Rx driving circuit includes:
   a biquad bandpass noise filter that includes at least one input terminal connected to at least one of the Rx lines and at least one output terminal, and that removes noise of signals received from the at least one of the Rx lines;
   an integrator that is connected to the at least one output terminal and that accumulates the charge variations passing through the biquad bandpass noise filter to obtain an accumulated charge variation;
   a sampling circuit that samples the accumulated charge variation output from of the integrator to obtain a sampled charge variation; and
   an analog to digital converter that converts the sampled charge variation sampled by and output from the sampling circuit into the touch raw data,
   wherein the biquad bandpass noise filter includes variable resistors and variable capacitors connected in parallel for center frequency and bandwidth adjustments,
   wherein the biquad bandpass filter includes:
   a first input terminal connected to a (k)th (k is a natural number) Rx line;
   a second input terminal connected to a (k+1)th Rx line.

2. The touch screen device of claim 1, wherein the biquad bandpass filter changes a pass band by adjusting resistance values of the variable resistors.

3. The touch screen device of claim 2, wherein the biquad bandpass filter includes:
   a first input terminal connected to a (k)th (k is a natural number) Rx line;
   a second input terminal connected to a (k+1)th Rx line
   a first fully differential amplifier including a negative input terminal, a positive input terminal, a positive output terminal, and a negative output terminal;
   a second fully differential amplifier including a negative input terminal, a positive input terminal, a positive output terminal, and a negative output terminal;
   a first output terminal connected to the positive output terminal of the second fully differential amplifier;

a second output terminal connected to the negative output terminal of the second fully differential amplifier;
a (1-1)th variable capacitor connected between the first input terminal and the negative input terminal of the first fully differential amplifier;
a (2-1)th variable capacitor connected between the negative input terminal and the positive output terminal of the first fully differential amplifier;
a (3-1)th variable capacitor connected between the negative input terminal and the positive output terminal of the second fully differential amplifier;
a (1-1)th variable resistor connected between the negative input terminal and the positive output terminal of the first fully differential amplifier;
a (2-1)th variable resistor connected between the positive output terminal of the first fully differential amplifier and the negative input terminal of the second fully differential amplifier; and
a (3-1)th variable resistor connected between the negative input terminal of the first fully differential amplifier and the negative output terminal of the second fully differential amplifier.

4. The touch screen device of claim 3, wherein the biquad bandpass filter further includes:
a (1-2)th variable capacitor connected between the second input terminal and the positive input terminal of the first fully differential amplifier;
a (2-2)th variable capacitor connected between the positive input terminal and the negative output terminal of the first fully differential amplifier;
a (3-2)th variable capacitor connected between the positive input terminal and the negative output terminal of the second fully differential amplifier;
a (1-2)th variable resistor connected between the positive input terminal and the negative output terminal of the first fully differential amplifier;
a (2-2)th variable resistor connected between the negative output terminal of the first fully differential amplifier and the positive input terminal of the second fully differential amplifier; and
a (3-2)th variable resistor connected between the positive input terminal of the first fully differential amplifier and the positive output terminal of the second fully differential amplifier.

5. The touch screen device of claim 4, wherein the (2-1)th, (2-2)th, (3-1)th, and (3-2)th variable resistors are set to have a first resistance value, the (1-1)th and (1-2)th variable resistors are set to have a second resistance value, the (2-1)th, (2-2)th, (3-1)th, and (3-2)th variable capacitors are set to have a first capacitance value, and the (1-1)th and (1-2)th variable capacitors are set to have a second capacitance value.

6. The touch screen device of claim 5, wherein each of the variable resistors includes:
a first resistor;
a second resistor connected with the first resistor in parallel;
a first switch connected to one end of the second resistor; and
a second switch connected to the other end of the second resistor.

7. The touch screen device of claim 6, wherein each of the variable capacitors includes:
a first capacitor;
a second capacitor connected with the first capacitor in parallel;
a third switch connected to one end of the second capacitor; and
a fourth switch connected to the other end of the second capacitor.

8. The touch screen device of claim 7, wherein each of the first to fourth switches is turned on when a control signal having a first voltage is input, and turned off when a control signal having a second voltage is input.

9. The touch screen device of claim 8, wherein, when the control signal having the first voltage is input to the first and second switches of the (2-1)th, (2-2)th, (3-1)th, and (3-2)th variable resistors and the third and fourth switches of the (2-1)th, (2-2)th, (3-1)th, and (3-2)th variable capacitors, the control signal having the second voltage is input to the first and second switches of the (1-1)th and (1-2)th variable resistors and the third and fourth switches of the (1-1)th and (1-2)th variable capacitors, and
wherein, when the control signal having the second voltage is input to the first and second switches of the (2-1)th, (2-2)th, (3-1)th, and (3-2)th variable resistors and the third and fourth switches of the (2-1)th, (2-2)th, (3-1)th, and (3-2)th variable capacitors, the control signal having the first voltage is input to the first and second switches of the (1-1)th and (1-2)th variable resistors and the third and fourth switches of the (1-1)th and (1-2)th variable capacitors.

10. The touch screen device of claim 1, wherein the biquad bandpass filter changes a Q-factor by adjusting the resistance values of the variable resistors and the capacitance values of the variable capacitors.

11. A method for driving a touch screen device which comprises a touch screen panel including Tx lines, Rx lines, and touch sensors formed at crossings of the Tx lines and Rx lines, the method comprising:
supplying a driving pulse to the Tx lines;
receiving charge variations of the touch sensors through the Rx lines;
removing noise of signals received from the Rx lines by using a bandpass filter having at least one input terminal connected to at least one of the Rx lines and at least one output terminal, wherein the biquad bandpass filter includes variable resistors and variable capacitors connected in parallel for center frequency and bandwidth adjustments;
outputting the charge variations to an integrator connected to the at least one output terminal;
accumulating, by the integrator, the charge variations passing through the bandpass filter to obtain an accumulated charge variation;
sampling the accumulated charge variation to obtain a sampled charge variation; and
converting the sampled charge variation sampled by the sampling circuit into the touch raw data,
wherein a first input terminal of the biquad bandpass filter receives signals of a (k)th (k is a natural number) Rx line, and a second input terminal of the biquad bandpass filter receives signals a (k+1)th Rx line.

12. The method of claim 11 wherein removing noise of signals received from the Rx line comprises using a biquad bandpass filter.

13. A touch screen device, comprising:
a touch screen panel including a plurality of Tx lines, a plurality of Rx lines, and touch sensors formed at crossings of the Tx lines and Rx lines;
a Tx driving circuit that supplies a driving pulse to the Tx lines; and an Rx driving circuit that samples charge variations of the touch sensors, which are received through the Rx lines;

a biquad bandpass noise filter that includes at least one input terminal connected to at least one of the Rx lines and at least one output terminal, and that removes noise of signals received from the at least one of the Rx lines, the biquad bandpass noise filter that is configured to be tuned to change a center frequency of a pass band, and is configured to be tuned change a pass band width;

an integrator that is connected to the at least one output terminal of the biquad bandpass noise filter and that accumulates the charge variations passing through the noise filter to obtain an accumulated charge variation;

a sampling circuit that samples the accumulated charge variation output from of the integrator to obtain a sampled charge variation; and a converter that converts the sampled charge variation sampled by and output from the sampling circuit into touch raw data, wherein the biquad bandpass noise filter includes:

a first input terminal connected to a (k)th (k is a natural number) Rx line;

a second input terminal connected to a (k+1)th Rx line.

* * * * *